June 2, 1953 C. C. DAVIS 2,640,886

MAGNETIC TRANSDUCER HEAD

Filed Sept. 28, 1951

INVENTOR
C. C. DAVIS
BY
J. F. McEneany
ATTORNEY

Patented June 2, 1953

2,640,886

UNITED STATES PATENT OFFICE 2,640,886

MAGNETIC TRANSDUCER HEAD

Charles C. Davis, Los Angeles, Calif., assignor to Western Electric Company, Incorporated, New York, N. Y., a corporation of New York Application September 28, 1951, Serial No. 248,703

5 Claims. (Cl. 179—100.2)

This invention relates to electromagnetic transducers and particularly to improvements in such units employing a plurality of magnetic heads disposed adjacent to each other to record on or reproduce from a multiple track magnetic tape.

It is the object of this invention to provide a multiple head electromagnetic transducer which may be employed in recording on or reproducing from a multiple track record with a minimum of distortion produced by cross-talk between adjacent heads.

A feature of the invention resides in the provision of a small magnetic path extending between a surface of one polarity on one head and the opposite polarity surface of an adjacent head and of such proportions as to effectively cancel the cross-talk leakage from the one head to the adjacent head.

In multiple track magnetic recording and reproducing systems it is the practice to employ a single transducer unit comprising a plurality of magnetic heads disposed adjacent to each other across the path of a multiple track magnetic tape, each head being electrically connected in an individual recording or reproducing channel. Recording on or reproduction from the several tracks may take place simultaneously or individually on selected tracks at predetermined times. If it were possible to provide complete magnetic shielding between the adjacent heads, no problem would be encountered. However, as the heads must be in contact with the recording medium at the point of sound translation, a portion of the heads must be exposed, thus providing a path for leakage flux between the adjacent unshielded surfaces of the heads.

Present day magnetic heads are usually of the ring type, consisting of two semicircular laminated magnet members forming front and rear gaps having considerable reluctance in the gaps. Electrical cross-talk between heads in a multiple head transducer results from fringing flux due to the proximity of similar unshielded surfaces of the adjacently disposed heads. It has been determined by applicant that if one such head is placed adjacent another without shielding, the second head will show a voltage across its terminals only —16 decibels relative to the input to the first head. If a practical amount of magnetic shielding is placed between the heads, such that the transducer may be used to record on or reproduce from a recording medium without the shielding interfering with free movement of the medium in contact with the heads in the area of the translation point, the value of this voltage may be reduced to possibly —40 decibels relative to the input voltage on an adjacent head. While this permissible amount of shielding produces a considerable reduction in this voltage, the leakage flux at the necessarily exposed surfaces still constitutes a source of troublesome cross-talk in program material.

In accordance with this invention, cross-talk between adjacent magnetic heads of a commercially usable multiple head transducer is reduced to a point at which no distortion introduced from this source is noticeable in program material. This is accomplished in accordance with the invention by the use of a small magnetic path between one-half of one magnetic head and the half of the adjacent head which is of opposite polarity. This magnetic path is so proportioned that it effectively cancels the cross-talk leakage from one head to the other and, therefore, substantially decouples the two heads magnetically. As the magnetic paths handle relatively small amounts of flux, they do not alter the usual characteristics of recording and reproducing heads or of the over-all system in any way and they operate to produce the desired result relatively independent of frequency.

The invention will be more clearly understood by reference to the following description when read in connection with the accompanying drawing, in which.

Figure 1:
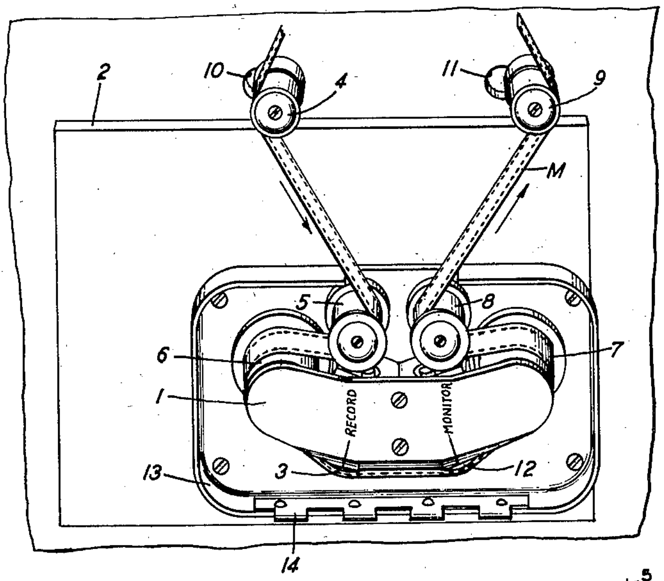
Fig. 1 is a front elevation of a multiple track magnetic recording apparatus showing the path of travel of a magnetic medium past the electromagnetic transducer.

Referring to Fig. 1, numeral 1 indicates a support which is secured to an inner panel 2 of the housing of a magnetic recording apparatus. A multiple head electromagnetic transducer, indicated at 3, is mounted in support 1 in the path of travel of a magnetic recording medium M. The recording medium M is provided with marginal perforations whereby it can be driven by suitable sprocket means (not shown) in the direction of the arrows over freely rotatable rollers 4, 5, 6, 7, 8 and 9. The rollers 4 and 9 are the film engaging elements of a known mechanical filter. The shafts on which rollers 4 and 9 are mounted extend through elongated openings 10 and 11 respectively, to permit movement of these rollers toward and away from each other.

A second multiple head electromagnetic transducer similar to transducer 3 is indicated at 12. This transducer 12, which is mounted in support 1, operates to reproduce the signal recorded by transducer 3 to thus provide a means for monitoring the sound being recorded. The complete unit is magnetically shielded from outside magnetic fields by an enclosure 13 having a hinge 14 to which an enclosing door (not shown) may be attached.

Figure 2:
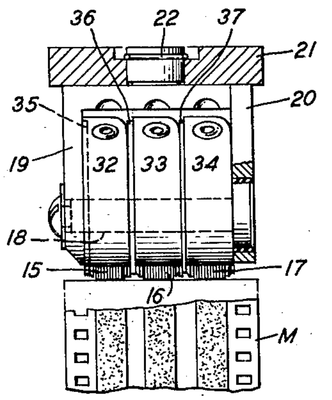
Fig. 2 is a plan view of a multiple head transducer showing the arrangement of the magnetic heads and the relation thereof with respect to the magnetic medium.

Referring to Fig. 2, magnetic heads 15, 16, and 17 are axially aligned on a member 18 and are clamped between the spaced arms 19 and 20 of a yoke 21. An internally threaded opening 22 in yoke 21 provides a means for securing the combined unit in support 1 of Fig. 1. The magnetic heads 15, 16, and 17 are accurately spaced to be in alignment with the track areas on medium M, which contacts the surfaces of the heads for a short distance on both sides of the point of sound translation.

Figure 3:
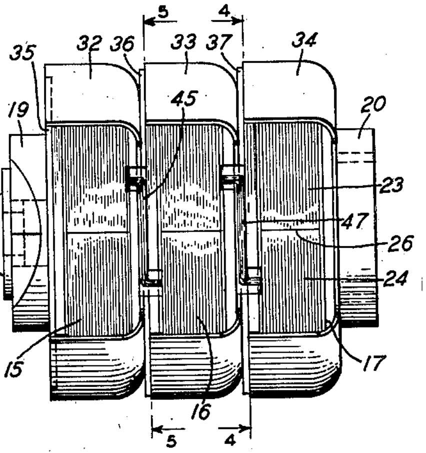
Fig. 3 is an enlarged view of the multiple head transducer showing the location of the means forming a magnetic path between adjacent heads in accordance with this invention.
Figure 4:
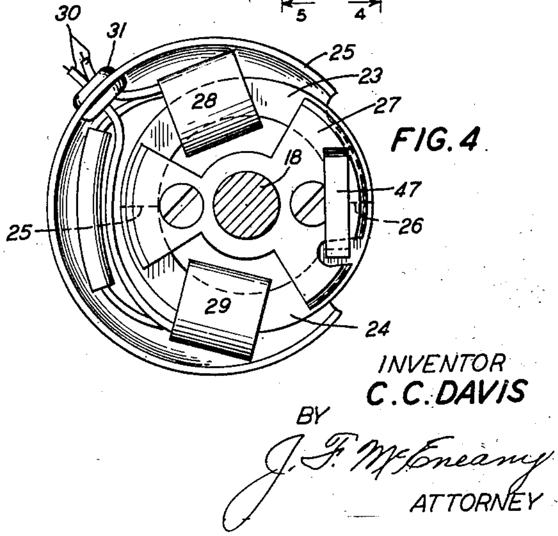
Fig. 4 is a view taken through line 4—4 of Fig. 3.

Referring to Figs. 3 and 4, each of the magnetic heads 15, 16, and 17 are made up of two semi-circular members 23 and 24 formed of laminated iron and joined as a unit to form front and rear non-magnetic gaps 25 and 26. The laminated members 23 and 24 are clamped together as a unit by two brass clamps, one of which is shown at 27 (Fig. 4). Signal currents are carried to coil 28 surrounding member 23 and to coil 29 surrounding member 24 by means of wires 30 extending through a rubber grommet 31.

Cup-shaped elements 32, 33, and 34 in combination with disc elements 35, 36, and 37, respectively, form magnetic shielding means substantially completely isolating each one of the heads from the head adjacent thereto and from surrounding magnetic fields. However, it will be observed that in order to permit contact between the magnetic heads and the medium M, which travels in an arcuate path at the point of contact, a portion of the adjacent surfaces of the magnetic heads near the point of sound translation must be left unshielded. While the unshielded surface of each head is small compared to the entire surface of the magnetic head, it is still large enough to permit sufficient leakage flux to be noticeable as cross-talk in program material.

Applicant conceived that this troublesome cross-talk can be reduced to a value at which it may be disregarded as a source of distortion in program material. In accordance with this invention applicant disposes a small magnetic path between the adjacent surfaces of the magnetic heads in the region of the adjacent unshielded surfaces, the magnetic field extending from a surface of one polarity on one head to a surface of opposite polarity on the head adjacent thereto. The leakage producing cross-talk is effectively canceled and the adjacent magnets are substantially decoupled magnetically.

Figure 5:
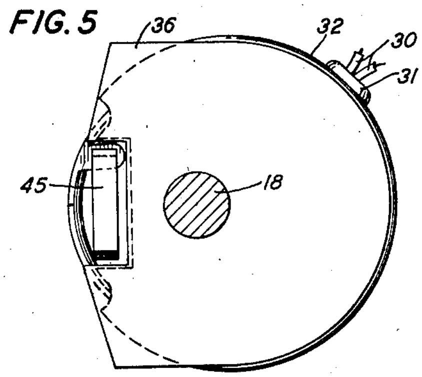
Fig. 5 is a view taken through line 5—5 of Fig. 3.

As shown clearly in Figs. 3, 4 and 5, the magnetic path between heads 15 and 16 is formed by a member 45 extending from the upper half of head 15 to the lower half of head 16. The magnetic path between head 16 and head 17 is formed by a member 47 extending from the upper half of head 16 to the lower half of head 17.

In the application of the invention as shown herein, the members 45 and 47 each comprise 3 or 4 formed pieces of .004 inch Permalloy approximately $\frac{1}{16}$ inch wide and approximately $\frac{3}{8}$ inch long arranged to either contact or nearly contact the Permalloy laminations of the heads. It is to be understood that a larger number of laminations may be employed or, if desired, the magnetic path may be formed by a single, thick lamination. In the multiple head transducer constructed in accordance with this invention, the value of the voltage in one head due to cross-talk from an adjacent head is reduced from —40 decibels relative to the input to the adjacent head, to a value of more than —60 decibels. Thus, electrical cross-talk introduced into the signal recorded on or reproduced from a multiple track magnetic tape, which heretofore constituted a source of troublesome distortion in the signal, is, by means of this invention, reduced to a negligible value.

It is recognized that due to non-linearity of the iron in the circuits, the optimum adjustment of elements 45 and 47 with respect to the magnet surfaces between which they extend might be different for a recording head than for a reproducing head in order to obtain maximum over-all reduction of cross-talk. Therefore, in accordance with this invention, adjustable supporting means for elements 45 and 47 may be provided, which means can be operated exteriorly of the assembled unit to permit precise adjustment of the position of these elements and of the spacing between surfaces of the heads and the ends of these elements in order to obtain optimum magnetic decoupling of the adjacent heads for both recording and reproducing.

Applicant, therefore, provides an improved multiple head transducer in which means are provided wholly within the existing structure of the unit to minimize distortion in recorded and reproduced signals resulting from electrical cross-talk between the necessarily unshielded areas of the closely spaced magnetic heads.

What is claimed is:

1. An electromagnetic transducer comprising a plurality of spaced magnetic heads, means partially magnetically shielding said plurality of heads one from the other and a metallic member extending from the exposed lateral surface of one head to the facing exposed lateral surface of a head adjacent thereto to form a low reluctance magnetic path between all said heads.

2. An electromagnetic transducer in accordance with claim 1 in which each said magnetic path comprises a laminated metallic member extending from a surface of one polarity on one head to a surface of opposite polarity on the adjacent one of said plurality of heads.

3. An electromagnetic transducer assembly comprising a plurality of axially aligned magnetic heads, each of said heads comprising a pair of electromagnets having facing poles forming a non-magnetic gap therebetween, magnetic shielding means disposed between the adjacent surfaces of said heads with the exception of a limited area of said surfaces including the facing poles of said electromagnets, and a metallic member forming a low reluctance magnetic path between the adjacent surfaces of said heads at the unshielded portions thereof.

4. An electromagnetic transducer assembly in accordance with claim 3 in which said metallic member extends from the surface of an electromagnet of one polarity in one head to an electromagnet of opposite polarity in the head adjacent thereto.

5. An electromagnetic transducer assembly comprising a plurality of electromagnetic heads each comprising a core and a pair of pole members forming an air-gap therebetween, means supporting said plurality of heads in spaced relation with the air-gaps therein in alignment transversely of a longitudinally movable magnetic recording medium, magnetic shielding means interposed between the adjacent surfaces of said heads except for a limited area thereof which includes the air-gap forming pole members, and a metallic member forming a low reluctance magnetic path extending from an unshielded lateral surface of one polarity on one head to an unshielded lateral surface of opposite polarity on a head adjacent thereto.

CHARLES C. DAVIS.

References Cited in the file of this patent

UNITED STATES PATENTS

| Number | Name | Date |
|---|---|---|
| 2,555,110 | Bobb | May 29, 1951 |

FOREIGN PATENTS

| Number | Country | Date |
|---|---|---|
| 884,881 | France | May 10, 1943 |